United States Patent [19]
Covelli-Ingwell et al.

[11] Patent Number: 5,540,719
[45] Date of Patent: Jul. 30, 1996

[54] NIGHT LIGHT AND PACIFIER SYSTEM

[76] Inventors: Carmen M. Covelli-Ingwell; Jonathan V. Ingwell, both of 24052 Silverbay Dr., Lake Forest, Calif. 92630

[21] Appl. No.: 417,043

[22] Filed: Apr. 3, 1995

[51] Int. Cl.[6] .................................................. A61J 17/00
[52] U.S. Cl. ............................ 606/234; 362/154; 362/801
[58] Field of Search ................................... 362/154, 801; 606/234–236; D24/194–199

[56] References Cited

U.S. PATENT DOCUMENTS

| | | |
|---|---|---|
| D. 243,366 | 2/1977 | Lybe et al. . |
| D. 249,161 | 8/1978 | Rohrig . |
| D. 276,939 | 12/1984 | Pascoe . |
| 4,688,571 | 8/1987 | Tesler . |
| 4,716,902 | 1/1988 | Swartz . |
| 4,890,205 | 12/1989 | Shaffer ..................................... 362/154 |
| 5,007,924 | 4/1991 | Jekel . |
| 5,148,356 | 9/1992 | Freese et al. ............................. 362/801 |

FOREIGN PATENT DOCUMENTS 9428857  12/1994  WIPO ..................................... 606/234

Primary Examiner—Gary Jackson
Assistant Examiner—Glenn Dawson
Attorney, Agent, or Firm—James G. O'Neill

[57] ABSTRACT

A night light and pacifier holding system for holding a plurality of decorative pacifiers therein in aligned positions. A hollow base in the form of elliptical dish shaped upper and lower portions are secured together with a light source having a diffuser therein. A substantially flat base of the system is capable of supporting the system on a flat surface. The upper surface of the upper portion of the system includes a plurality of openings formed therein with guiding and securing pins formed adjacent each of the openings in order that pacifiers having decorative shaped heads may be inserted in the openings and held in aligned positions by holes formed in each of the pacifiers captured in the pins. The pacifiers are formed from a luminescent material which may be recharged from the light source within the hollow base when held in the openings.

20 Claims, 4 Drawing Sheets

NIGHT LIGHT AND PACIFIER SYSTEM

BACKGROUND OF THE INVENTION

1. Field of the Invention

This invention relates generally to baby pacifiers, and more particularly, to a combination night light and pacifier system.

2. Description of Related Art

The use of pacifiers to calm babies is well known. A large variety of pacifiers exist for use by children having different wants or needs. Such pacifiers may include a handle which acts as a teething ring. Most known pacifiers consist of three essential parts, namely, a nipple, a mouth template and a handle. These pieces are generally constructed of plastic or rubber, or a combination thereof so that they may be easily cleaned and sterilized.

Furthermore, babies become dependent upon pacifiers, but often lose them or accidentally throw them away. Such lost or accidentally thrown away pacifiers can be difficult to find, particularly in the middle of a dark room or environment. It is known to provide a pacifier with a light emitting diode, or the like, so that such a pacifier may be more easily found in the dark and quickly returned to a baby. U.S. Pat. No. 4,688,571 to Tesler and U.S. Pat. No. 4,716,902 to Swartz illustrate pacifiers which are either luminous, or contain a light emitting diode, to enable such pacifiers to be easily found in a dark environment.

Additionally, U.S. Pat. No. 5,007,924 to Jekel discloses a baby pacifier having a straight bar handle to facilitate the grasping of the same by an infant, and also includes a cylindrically movable clip-on luminescent sheath for mounting over the cross-bar. This sheath can be removed so as to be charged in a bright light, and returned to the bar where it glows, to facilitate the infant's grasp of the pacifier in the dark.

Finally, U.S. Design Pat. Nos. 243,366 to Lybe et al, 249,161 to Rohrig and U.S. Pat. No. 276,939 to Pasco all show various protective casings or shaped pacifiers for use by babies.

As noted, because of their size, pacifiers used by babies are frequently lost. To overcome this problem, securing means or means for fixing such pacifiers to a baby have been proposed. These securing features are provided for substantially the same reasons that pacifiers have been made luminous. However, a common disadvantage of all the known prior art is that there is no known system for easily storing the pacifiers when not in use, and, in the case of luminescent pacifiers, no easy means for charging the luminescence thereof, without removing the same and placing the pacifiers under a bright light. A further disadvantage of the known pacifiers, is that they are not always attractive to a child, nor are they easily grasped by the small hands of a baby.

There is, therefore, a need in the art for a pacifier system which provides a storage means for pacifiers where they may be stored so as to be easily found when desired to be used, and which system also charges the luminescence of the pacifiers, so that they may be more easily found in the dark.

SUMMARY OF THE INVENTION

It is a general object of the present invention to provide an improved pacifier holding system for pacifiers when they are not in use. It is a more particular object of the present invention to provide a luminescent pacifier which may be easily charged in a pacifier holding system. It is a still more particular object of the present invention to provide an improved combination pacifier holder and pacifier charging system. It is yet another particular object of the present invention to provide an improved pacifier system that may be utilized as a night light. It is a still further particular object of the present invention to provide an improved night light and pacifier system which is easily transported, or which may be supported in substantially any desired position. And, it is still further particular object of the present invention to provide an improved method and system for holding a plurality of luminescent pacifiers and recharging the luminescence thereof in an attractive night light system.

In accordance with one aspect of the present invention, there is provided an improved and novel night light system having a plurality of decorative shaped pacifiers which are removably held within a plurality of openings formed in a base. The base is provided with a low wattage light source so as to recharge the luminescence of the pacifier when not in use. The preferred pacifiers of the present system are shaped so as to be easily gripped by a baby's hand and so as to be pleasing in appearance. A light diffuser may be provided within the interior of the base of the night light so as to block direct light from passing through openings, where the pacifiers are normally held, when not in use.

BRIEF DESCRIPTION OF THE DRAWINGS

The objects and features of the present invention, which are believed to be novel, are set forth with particularity in the appended claims. The present invention, both as to its organization and manner of operation, together with further objectives and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified holding system, which may be used as a night light and pacifier holder.

Figure 1:
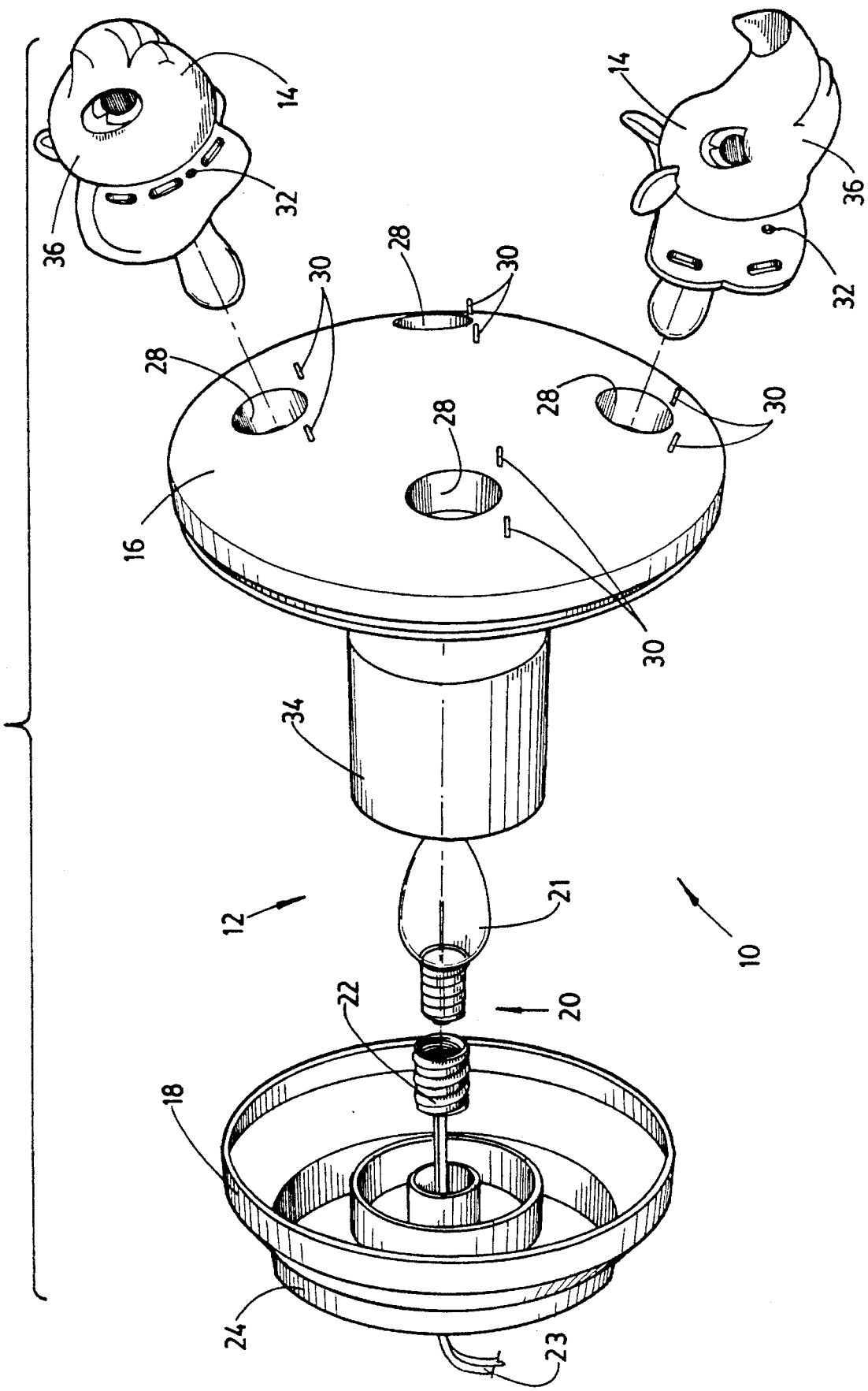
FIG. 1 is an exploded perspective view of the night light and pacifier holding system of the present invention.
Figure 2:
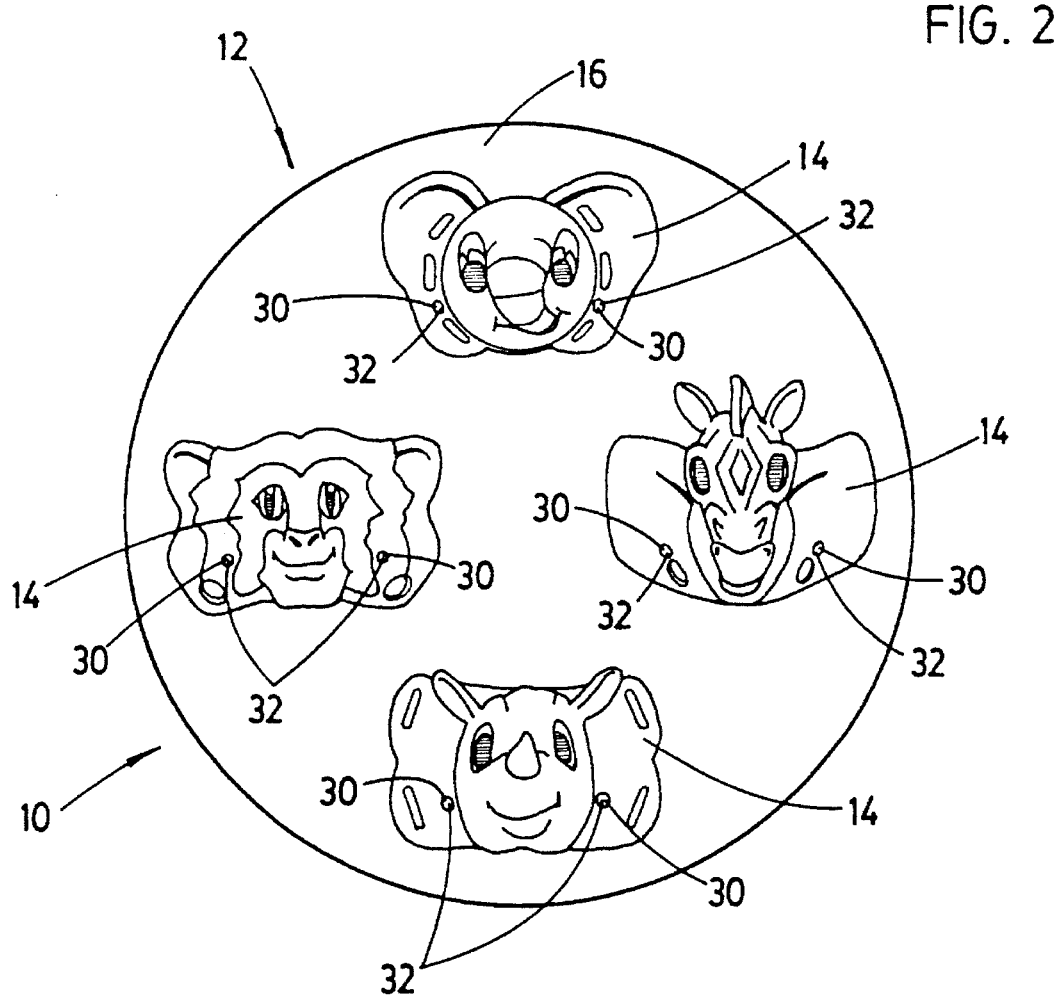
FIG. 2 is a top plan view of the night light and pacifier holding system of FIG. 1.
Figure 3:
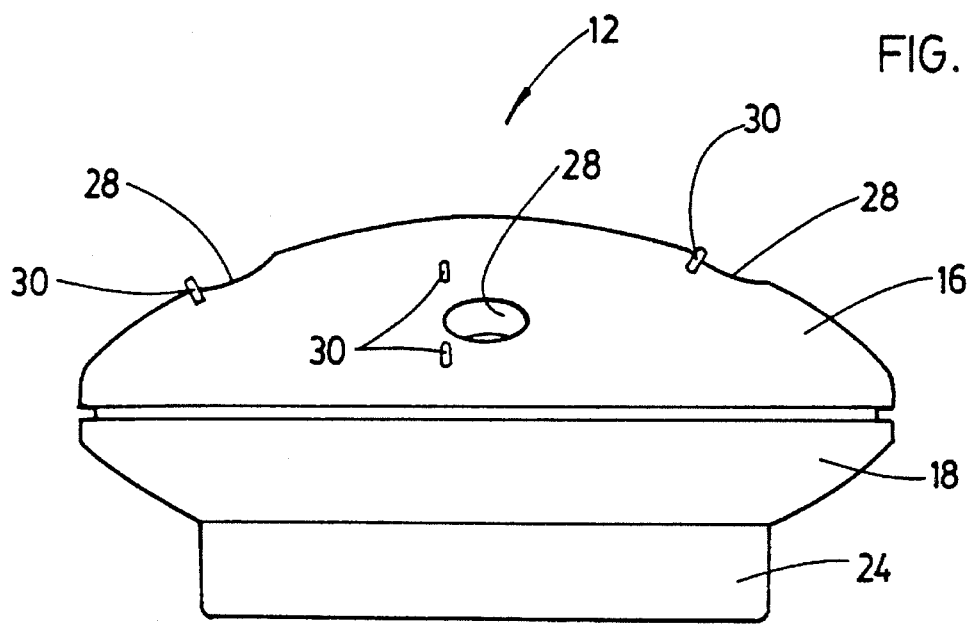
FIG. 3 is a side elevational view of the night light holder of FIG. 1, with the pacifiers removed therefrom.
Figure 4:
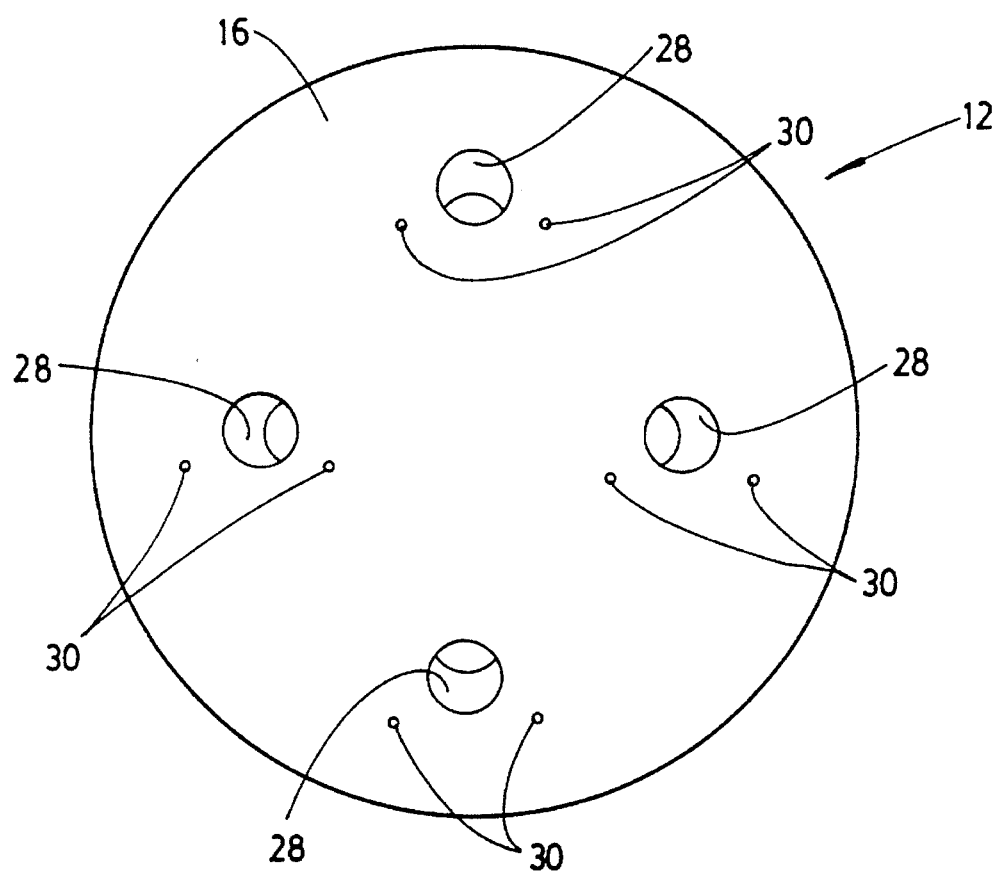
FIG. 4 is a top plan view of the night light holder of FIG. 1 with the pacifiers removed therefrom.

Referring now to FIG. 1 of the drawings, there shown is an exploded view of a preferred embodiment of the inventive night light and pacifier system, generally indicated at 10, constructed in accordance with the principles of the present invention. The system preferably includes a night light 12 and a plurality of pacifiers 14, only two of which are shown in this FIG. 1 The night light 12 is also preferably formed so as to hold a plurality of pacifiers, and may take any desired configuration, but is preferably formed from upper and lower dish-shaped elements 16, 18 which may be removably secured together in any manner known to those skilled in the art, so as to provide a substantially hollow inner chamber 19 when so secured.

The holder/night light 12 preferably includes a lighting means 20 therein, such as a low-wattage bulb 21 held in socket 22, which is in turn electrically connected to a power source, such as a standard house plug, via an electrical cord 23. The low wattage bulb 21 may also be connected to a battery means held within the lower portion 18, or an extending substantially circular base 24 secured to lower portion 18, in any manner known to those skilled in the art. The circular base 24 includes a substantially flat lower surface which serves to support the holder 10 and, therefore, the entire system 10 on any available, substantially flat surface, such as a desk, dresser, table, or the like. Alternatively, holder 12 may be provided with one or more openings or slots 26 formed within base 24, to enable the entire system to be hung on nails, hooks or the like on a vertical partition, such as a wall, in a manner well known to those skilled in the art. A further plurality of venting slots 27, may also be provided in base 24.

Referring now to FIGS. 1 through 6, the upper substantially dish shaped portion 16 is shown as having a plurality of pacifier nipple holding means or openings 28. The openings 28 are sized and dimensioned so as to receive and support therein the nipples of a plurality of pacifiers 14, such as the four shown in FIG. 2. The pacifiers are preferably, at least partially formed from a luminescent plastic material. Adjacent each opening 28 there are provided alignment, or guiding and securing means 30, such as two pins. These pins are positioned so as to enable aligned openings 32 formed in each of the pacifiers 14, to mate therewith, so as to align and securely hold the pacifiers 14 in desired and aesthetically appealing positions on the holder, as shown most clearly in FIG. 2. The pacifiers 14 are preferably aligned so as to all face in the same direction and so as to be charged by the light shining through tubular portions connected to the openings 28, from the bulb 21, as described more fully below.

Figure 5:
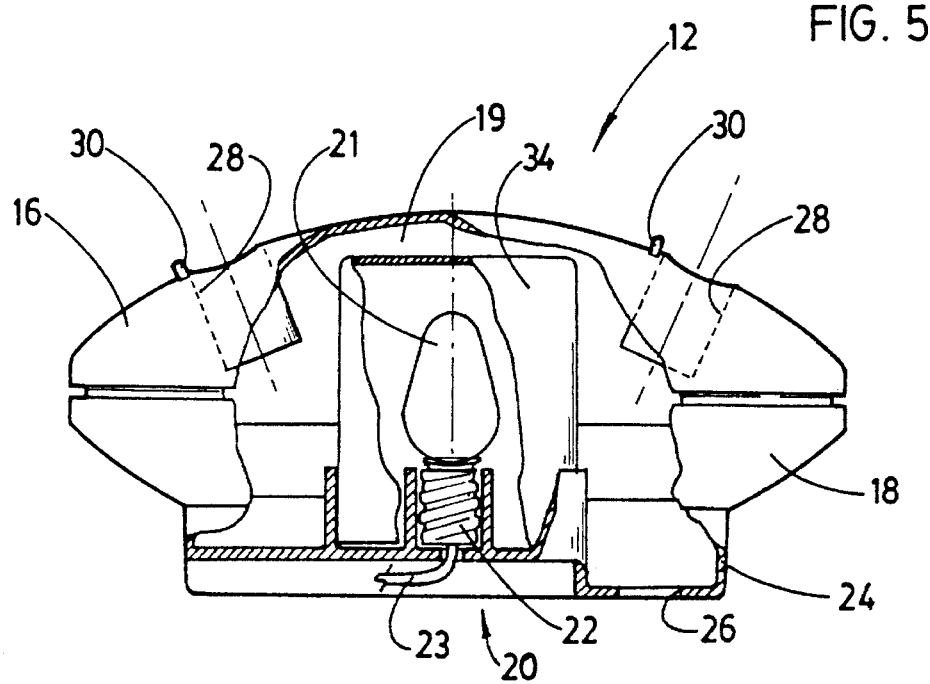
FIG. 5 is a partial cross-sectional view of the night light holder of the present invention.
Figure 6:
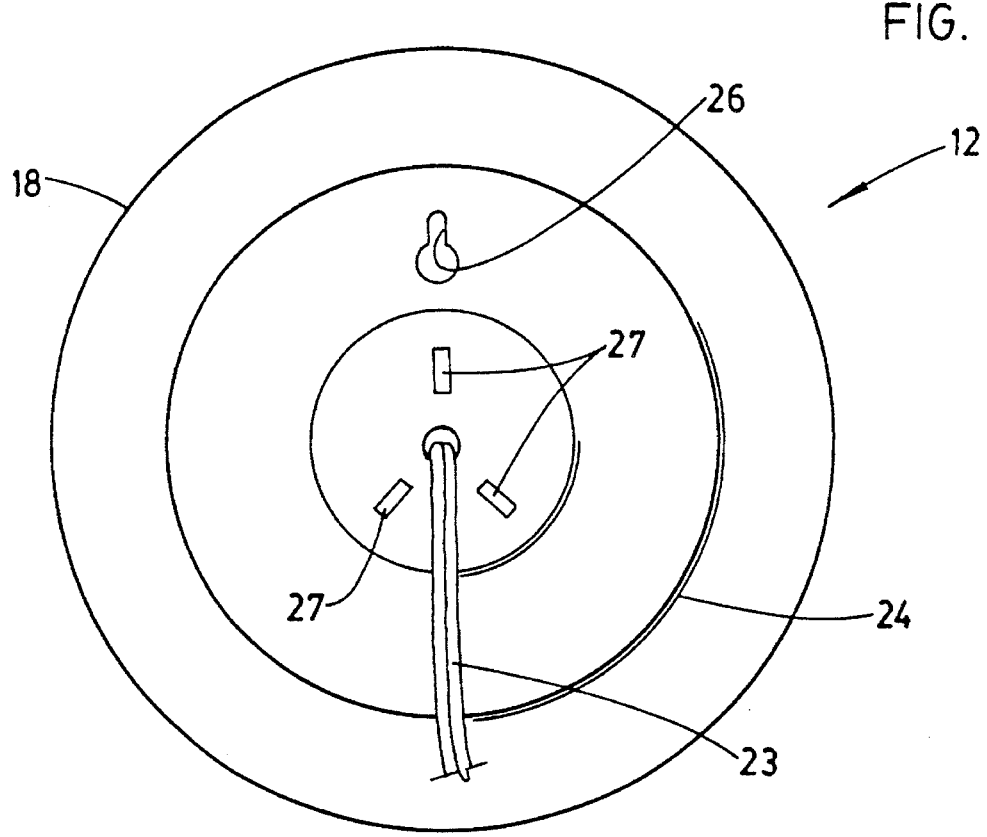
FIG. 6 is a bottom plan view of the night light holder.

As shown in FIGS. 1 and 5, the light means 20 preferably includes a diffuser 34 surrounding the bulb 21, so as to diffuse the light and prevent it from shining too brightly through the openings 28, when any or all of the pacifiers 14 are removed therefrom. The pacifiers 14 preferably include decoratively shaped head portions, in the form of animals or some other type of decorative characters, which are pleasing to a baby. Furthermore, these shaped head portions should be of a size that they are easily grasped in the hand of a baby.

Figure 7:
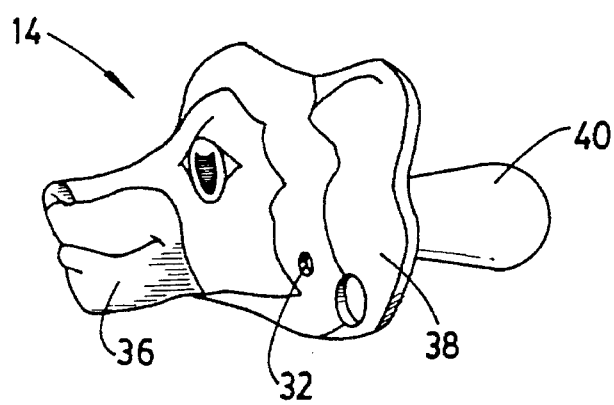
FIG. 7 is a side elevational view of one of the preferred pacifiers of the present invention.
Figure 8:
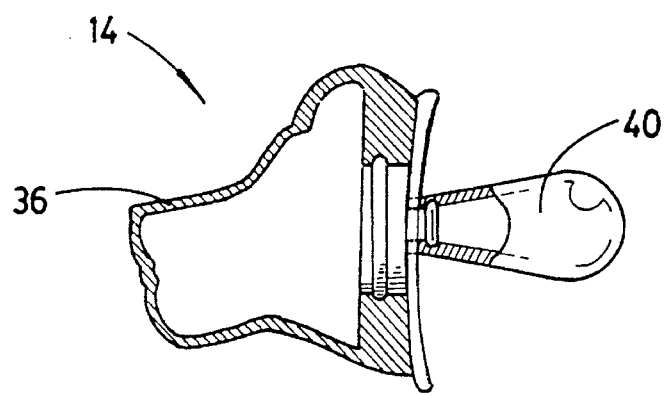
FIG. 8 is a partial cross-sectional view of the pacifier of FIG. 7.

As shown more clearly in FIGS. 7 and 8, a typical animal or character shaped head portion 36 of a pacifier 14 is preferably formed from a luminescent material, of a type well known to those skilled in the art. This head portion 36 is secured or locked to a nipple portion 40, with a shield portion 38 therebetween. Either the shield portion 38 or head 36 may have the alignment holes or openings 32 formed therethrough, for aligning and securing the pacifiers in the pins 30 adjacent openings 28, as described above.

Thus, there has been described an improved and simplified combination night light and pacifier holding system. This system preferably includes both a night light and ornamental pacifiers removably secured thereon. The night light both holds and recharges the luminescence of at least a portion of the pacifiers. The pacifiers may be easily removed or held in position in openings on the night light in aligned and secured positions so as to prevent the pacifiers from being lost. The holder may be mounted on any substantially flat surface, including a vertical partition, and is attractive in appearance. Furthermore, both because of the night light and their luminescence, the pacifiers may be easily found in the dark when in the holder. Since at least a portion, such as the head of each pacifier, is made from a luminescent material, in a manner well known to those skilled in the art. The pacifiers are also easily located when away from the holder, and since the luminescent material is charged when held in the holder, with the night light on, the pacifiers will continue to retain their luminescence so as to be more easily located when removed from the holder. The light assembly within the hollow interior of the holder preferably has a low wattage light to provide a low intensity night light, which light also charges the luminescent pacifiers placed therein. In addition, the pleasing animal or character shapes of the pacifiers provide a unique and attractive appearance both to the pacifiers and to the holder when held in aligned positions therein.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A pacifier system comprising, in combination:
    a substantially hollow holder comprising a top portion secured to a bottom portion, with said bottom portion having a base for supporting said pacifier system on a flat surface;
    a light source, connected to a power source, held within a hollow interior of said substantially hollow holder;
    a plurality of openings formed in said top portion of said substantially hollow holder; and
    a plurality of pacifiers formed in distinct shapes adapted to be inserted into and withdrawn from said plurality of openings within said top portion of said substantially hollow holder.

2. The pacifier system of claim 1, wherein said top portion of said substantially hollow holder includes first alignment means adjacent to each of said openings, and said plurality of pacifiers include second alignment means alignable with said first alignment means for securing said plurality of pacifiers, on said top portion, in aligned positions.

3. The system of claim 2 wherein said top portion is formed substantially in the shape of a dish having a substantially oval top surface with said plurality of openings spaced evenly around said substantially oval top surface.

4. The system of claim 3, further including a diffuser held within said hollow interior and surrounding said light source so as to diffuse light emitted by said light source.

5. The system of claim 4 wherein said bottom portion of said substantially hollow holder is shaped substantially as a dish, and said base is substantially circular.

6. The system of claim 5 wherein said first alignment means are pins, and said second alignment means are holes, and there are two pins formed adjacent each of said plurality of openings, and two holes formed in each of said plurality of pacifiers.

7. The system of claim 6 wherein said two pins formed adjacent each of said plurality of openings are positioned so that when said plurality of pacifiers are placed in said plurality of openings, said plurality of pacifiers will be aligned in a preselected position to provide a more pleasing appearance.

8. The system of claim 6 wherein there are four openings each of which has a tubular portion secured thereto, and said bottom portion and said top portion of said substantially hollow holder may be taken apart so as to remove said diffuser and replace said light source.

9. A combination night light and pacifier holding system, comprising in combination:

a substantially dish shaped lower portion removably secured to a substantially dish shaped top portion; said top portion having a plurality of openings formed therein;

said top portion further including a pair of alignment means, formed adjacent each of said plurality of openings to form alignment and securing means for a plurality of pacifiers inserted into said plurality of openings and held in said top portion;

said lower portion being substantially hollow and having a light source therein adapted to be connected to a power source; and a diffuser surrounding said light source within said substantially hollow lower portion.

10. The system of claim 9 wherein each of said plurality of pacifiers includes a holding portion shaped as an animal secured to a shield means and a nipple means; and each of said plurality of pacifiers has a pair of holes formed therein, sized and dimensioned so as to be captured in a pair of said alignment means formed adjacent one of said plurality of openings in said top portion, so as to be aligned and secured in said one of said plurality of openings.

11. The system of claim 10 wherein said alignment means are pins, there are four openings formed in said top portion, and four different animal shaped pacifiers secured and aligned within said four openings.

12. The system of claim 11 wherein each of said four openings includes a tubular member attached thereto at an angle with respect to said top portion, so as to allow said four pacifiers to be held in said four openings and tubular members in an aligned manner so that said four pacifiers may be easily viewed, and so that said four pacifiers are accessible for easy removal from said four openings.

13. The system of claim 9 wherein each of said pacifiers includes shield means formed so as to conform to the shape of said top portion and wherein each of said shield means includes a pair of holes therein, which pair of holes may be aligned with and held within said alignment means formed adjacent to each of said openings.

14. A night light and pacifier holder comprising, in combination:

a substantially hollow housing comprised of a top portion and a lower portion;

a substantially circular base secured to said lower portion for supporting said substantially hollow housing on a flat surface;

a light source secured within a socket held in said base, said socket adapted to be attached to a power source to light said light source;

said top portion being formed substantially in the shape of a dish so as to have a further hollow interior portion, whereby, when said top portion and said lower portion are secured together, a substantially hollow interior chamber is formed;

said top portion having an outer surface which is substantially elliptical in shape, and a plurality of openings formed in said outer surface and connected to said hollow interior chamber by a plurality of tubular members secured to said plurality of openings; and combination guiding and securing means secured to said outer surface adjacent to each of said plurality of openings.

15. The system of claim 14, further including a plurality of pacifiers having decorative shaped holding means, substantially curved shield means, and a nipple portion removably inserted in said plurality of openings.

16. The system of claim 14, wherein each of said pacifiers have alignment means formed therein, whereby, when the nipple portions of each of said plurality of pacifiers are inserted through said plurality of openings and into said tubular member, said substantially curved shield means will conform to the substantially elliptical shape of said outer surface of said top portion with the combination guiding and securing means held in the alignment means so as to secure said plurality of pacifiers in aligned positions so as to provide a pleasing appearance.

17. The system of claim 16 wherein said decorative shaped holding means of each of said plurality of pacifiers is formed in an animal shape from a luminescent plastic material.

18. The system of claim 17, further including a light diffuser held within said hollow interior and covering said light source; and wherein said light source is a low wattage light bulb.

19. The system of claim 18 wherein the animal shaped luminescent holding means of each of said pacifiers may be recharged by light coming from said low wattage light bulb, through said diffuser and into said tubular member, when said light impinges on said animal shaped luminescent holding means.

20. The system of claim 16 wherein said plurality of opening are four evenly spaced apart openings connected to four of said plurality of tubular members adapted to hold four pacifiers; wherein each of said combination guiding and securing means are comprised of two pins; wherein each of said alignment means comprise a pair of holes in each of said four pacifiers; and wherein a portion of each of said four pacifiers is formed from luminescent material that may be recharged by light coming from said light source within said hollow interior chamber through said four tubular members when said light impinges on the luminescent portions of said four pacifiers.

* * * * *